(12) United States Patent
Patwardhan et al.

(10) Patent No.: US 8,943,019 B1
(45) Date of Patent: Jan. 27, 2015

(54) LOOKUP OPTIMIZATION DURING ONLINE FILE SYSTEM MIGRATION

(75) Inventors: Kedar Patwardhan, Maharashtra (IN); Neha Naik, Maharashtra (IN); Sanjay Kumar Jain, Maharashtra (IN); Sushil Sarjerao Patil, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/085,671

(22) Filed: Apr. 13, 2011

(51) Int. Cl.
*G06F 17/00* (2006.01)
*G06F 17/30* (2006.01)

(52) U.S. Cl.
CPC .............................. *G06F 17/30079* (2013.01)
USPC ........................................... 707/610; 707/821

(58) Field of Classification Search
CPC ..................... G06F 17/30575; G06F 17/30079
USPC .................... 707/610, 821, 999.204
See application file for complete search history.

(56) References Cited

U.S. PATENT DOCUMENTS

| | | | | |
|---|---|---|---|---|
| 5,151,989 A * | 9/1992 | Johnson et al. | | 1/1 |
| 5,991,753 A * | 11/1999 | Wilde | | 1/1 |
| 6,269,382 B1 * | 7/2001 | Cabrera et al. | | 1/1 |
| 6,714,949 B1 * | 3/2004 | Frey, Jr. | | 1/1 |
| 6,938,039 B1 * | 8/2005 | Bober et al. | | 707/704 |
| 6,950,833 B2 * | 9/2005 | Costello et al. | | 1/1 |
| 6,952,699 B2 * | 10/2005 | O'Connell et al. | | 1/1 |
| 7,024,427 B2 * | 4/2006 | Bobbitt et al. | | 1/1 |
| 7,475,199 B1 * | 1/2009 | Bobbitt et al. | | 711/154 |
| 7,480,643 B2 * | 1/2009 | Barsness et al. | | 1/1 |
| 8,041,735 B1 * | 10/2011 | Lacapra et al. | | 707/783 |
| 8,078,583 B2 * | 12/2011 | Prahlad et al. | | 707/651 |
| 8,117,244 B2 * | 2/2012 | Marinov et al. | | 707/827 |
| 8,131,671 B2 * | 3/2012 | Mullen et al. | | 707/610 |
| 8,201,029 B2 * | 6/2012 | Jann et al. | | 714/48 |
| 2006/0129558 A1 * | 6/2006 | Brown et al. | | 707/10 |
| 2009/0089344 A1 * | 4/2009 | Brown et al. | | 707/205 |
| 2009/0254592 A1 * | 10/2009 | Marinov et al. | | 707/204 |
| 2009/0307245 A1 * | 12/2009 | Mullen et al. | | 707/101 |
| 2011/0225141 A1 * | 9/2011 | Chaudhry et al. | | 707/709 |

OTHER PUBLICATIONS

"Data Migration Manager" http://hub.opensolaris.org/bin/view/Project+dmm/WebHome#, retrieved on Aug. 4, 2011, p. 2.

* cited by examiner

*Primary Examiner* — Miranda Le
(74) *Attorney, Agent, or Firm* — Campbell Stephenson LLP (57) ABSTRACT

A system and method for migrating file systems is provided. A file system migration operation copies a plurality of files from a first file system to a second file system. A request to access one of the files being migrated during the file system migration operation results in the creation of a pseudo vnode for the file being requested in the second file system. The pseudo vnode is created prior to creating a vnode for the file in the second file system. In addition, the pseudo vnode is associated with a vnode of the file at the first file system. Information identifying the pseudo vnode is then returned to the application.

19 Claims, 7 Drawing Sheets

LOOKUP OPTIMIZATION DURING ONLINE FILE SYSTEM MIGRATION

FIELD OF THE INVENTION

This invention relates to file system migrations, and more particularly, to optimizing lookup of files during a file system migration.

DESCRIPTION OF THE RELATED ART

A file system is a mechanism by which data is stored and organized within files. Typically, a file system organizes sectors of a data storage device (e.g., a disk drive) into files and folders. Data is then stored within these files and folders to make up a file system usable by a computer system. As used herein, a file system can be the organized files and file folders or the software that maintains the organized structure.

In some cases, data can be switched or transferred from one file system to a second file system, a process known as a file system migration. A file system migration involves copying files from an original file system to a target file system. File system migrations are usually lengthy and affect the performance of a computer system and its components. Thus, it is desirable to enable file system migrations in such a manner that minimizes the impact on the performance of a computer system and its components during such file system migrations.

SUMMARY OF THE INVENTION

Various systems and methods for migrating file systems are disclosed. For example, one method involves receiving a request to access a file from an application during a file system migration operation. A file system migration operation copies a plurality of files from a first file system to a second file system. The plurality of files being copied as part of the file system migration operation includes the file to which access is requested. The method then involves creating a pseudo vnode for the file in the second file system, prior to creating a vnode for the same file in the second file system. This pseudo vnode is associated with a vnode of the file at the first file system. Thereafter, the method involves returning information identifying the pseudo vnode to the application. In one embodiment, this information identifying the pseudo vnode identifies the association between the pseudo vnode and the vnode of the file at the first file system.

In one embodiment, the method involves creating an association between the pseudo vnode and the vnode for the file at the first file system. In one embodiment, this association is a link. In another embodiment, an operation is performed on the file at the first file system using this association. In yet another embodiment, the association between the pseudo vnode and the vnode of the file at the first file system is removed, after the file system migration operation is complete.

The method may also involve creating the file at the second file system. An association is then made between the pseudo vnode and the vnode for the file at the second file system. Thereafter, a request to access the file is received from the application, while the file system migration operation is ongoing. In this case, information identifying the file at the first and second file systems is returned to the application.

In a further embodiment, the method involves deferred copying of an existing file from the first file system to the second file system, until the existing file is closed at the first file system.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

File system migration is a process that involves copying or transferring files from one file system (e.g., a native file system) typically stored on a first storage device to a second file system (e.g., a target file system) typically stored on a second storage device. File system migrations can be performed for a number of different reasons. For example, a file system migration can be performed to switch from one file system format to another, to begin operating on a different machine, to lease out a storage array, or to enable thick to thin storage deployment.

A file system migration process can be performed while a computer system is shut down. However, this scenario is not ideal because a computer system and its components (e.g., applications, storage devices, and so on) are shut down and inaccessible for the duration of the file system migration. Ideally, a file system migration is performed while a computer system and its components continue operating. This means that files are copied from a native file system to a target file system as part of a background process while a computer system and its components continue operating (e.g., a process referred to as an online file system migration).

Performing a file system migration while a computer system continues operating is an attractive feature because doing so minimizes the amount of time that a computer system is shut down and/or inaccessible. Nevertheless, performing a file system migration process while a computer system and its components continue operating presents numerous challenges. This is because of the way in which an application searches for files and attempts to perform operations on such files, while a file system migration process is ongoing.

Whenever an application seeks to perform an operation on a file, the application searches a file system to access the file needed to perform such an operation (e.g., a process known as performing a file lookup). Once a file system migration process begins, the application begins using the target file system to search for files. However, such files may not exist within the target file system at the time that a file lookup is performed. This can occur, for example, when the file being searched for has not yet been copied (e.g., migrated) from the native file system to the target file system. This can be a frequent occurrence, particularly when a file system migration process involves copying a large number of files from the native file system to the target file system.

In cases where the file being searched for does not exist on a target file system, a computer system will attempt to create a new file within the target file system that corresponds to the file being searched for. Creating a new file within the target file system involves creating the new file within both the target file system and the native file system in order to allow the native file system to remain up to date with the target file system at all times during the migration process. However, creating the file within both file systems requires a significant amount of time and resources by the computer system to create and update the new file within both file systems according to file operations performed on such a file (e.g., in addition to the time and resources needed to perform a file system migration). This additional time and resources used by the computer system can significantly degrade the performance of the computer system, and more particularly, degrade the performance of an application running on such a computer system during the file system migration period.

Figure 1:
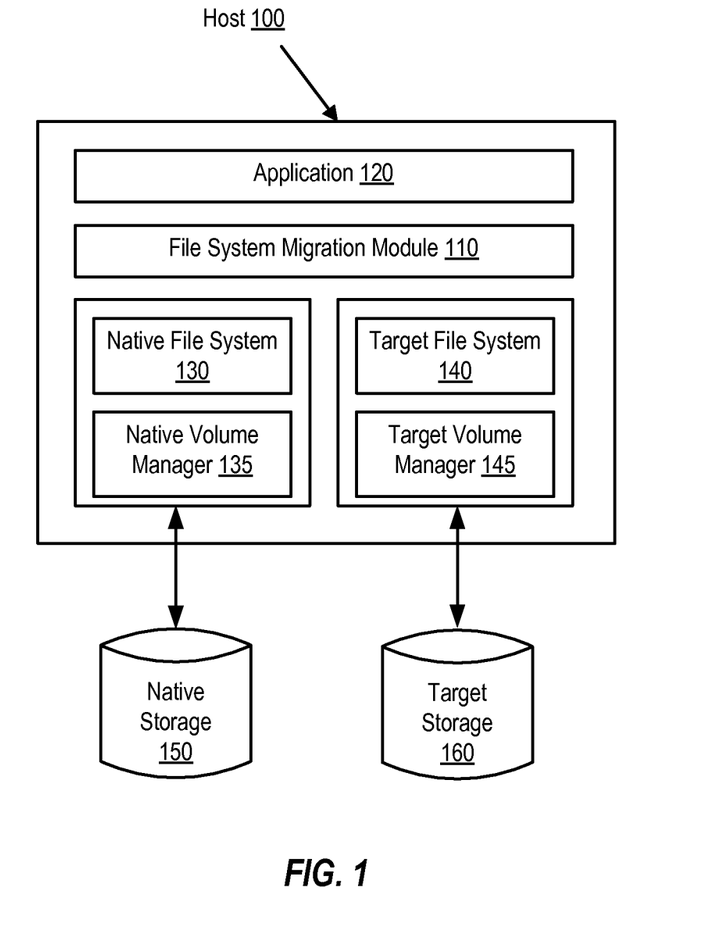
FIG. 1 is a block diagram showing a system for performing file system migrations, according to one embodiment of the present invention.

The system of FIG. 1 can improve the performance of an application during a file system migration process. This can be accomplished by delaying the creation of a new file on the target file system in situations where the file being searched for does not exist on the target file system. Instead, the system of FIG. 1 provides for the creation of a temporary representation of a file (e.g., a pseudo vnode) at a target file system and an association between the temporary representation of the file and the actual file stored on the native file system. An application is able to perform operations on the file at the native file system using such an association. Such actions can result in reduced impact on application performance, particularly as compared to the creation of a new file at the target file system.

FIG. 1 is a block diagram showing a system for performing file system migrations. The system of FIG. 1 includes a host 100, which further includes a file system migration module 110, an application 120, a native file system 130, a native volume manager 135, a target file system 140, and a target volume manager 145. Host 100 and its components are also shown as being in communication with native storage 150 and target storage 160.

File system migration module 110 enables file system migrations from native file system 130 to target file system 140. File system migration module 110 copies data files on native file system 130 (stored on native storage 150) to data files on target file system 140 (stored on target storage 160). Although not shown, file system migration module 110 can also copy data files from a native file system to a target file system, where each file system is stored within storage devices at different locations and/or on different host computers.

Moreover, file system migration module 110 performs file lookup operations on behalf of application 120 to locate files on which to perform file access operations. File system migration module 110 also provides information regarding the location of a file being searched for to application 120. Such information can describe the location of a file at native file system 130 or target file system 140. This information can also describe a temporary representation of a file at target file system 140 with an association (e.g., a link or pointer) to the actual file at native file system 130.

File system migration module 110 creates a temporary representation of a file (e.g., a pseudo vnode) and also associates the temporary representation of the file with the actual file stored on native file system 130. File system migration module 110 also removes such associations, whenever such files are copied over to target file system 140 or whenever a file system migration process is completed. In addition, file system migration module 110 associates a temporary representation of a file with a representation of the actual file at target file system 140, once the file has been copied to target file system 140.

Application 120 is an application running and performing operations on host 100. For example, application 120 can perform read and write operations on data files within a file system, such as native file system 130 and target file system 140. In addition, application 120 continues to execute and perform operations on data files before, during, and after file system migrations are performed by host 100.

Native file system 130 is a file system for organizing data into files and folders. Native file system 130 describes the originating file system for a file system migration process. Native file system 130 utilizes one of several possible file system formats. For example, native file system 130 can utilize one of File Allocation Table (FAT), New Technology File System (NTFS), Hierarchical File System (HFS), High-Performance File System (HPFS), Unix File System (UFS), Veritas File System (VxFS), and so on.

Target file system 140 is also a file system for organizing data into files and folders and describes the destination file system for a file system migration process. Target file system 140 can be located within the same host computer as native file system 130 or within a different host computer. In addition, target file system 140 can utilize one of several possible file system formats. Such a file system format can be the same or different than the file system format of native file system 130.

Native volume manager 135 and target volume manager 145 allocate physical sectors of a storage device into a logical volume. For example, native volume manager 135 allocates sectors or blocks of space within native storage 150 to a logical volume storing data that is organized into files and folders by native file system 130. Similarly, target volume manager 145 allocates sectors or blocks of space within target storage 160 to a logical volume storing data that is organized into files and folders by target file system 140.

Native storage 150 and target storage 160 can be implemented from storage devices such as hard disks, optical disks, floppy disks, or other storage mediums. Such storage devices can be organized into disk arrays. Such disk arrays can be of a fixed size and are typically broken down into data blocks. These data blocks are then organized into files and folders by a corresponding file system. Thus, native storage 150 stores data files for native file system 130 and target storage 160 stores data files for target file system 140.

Figure 2:
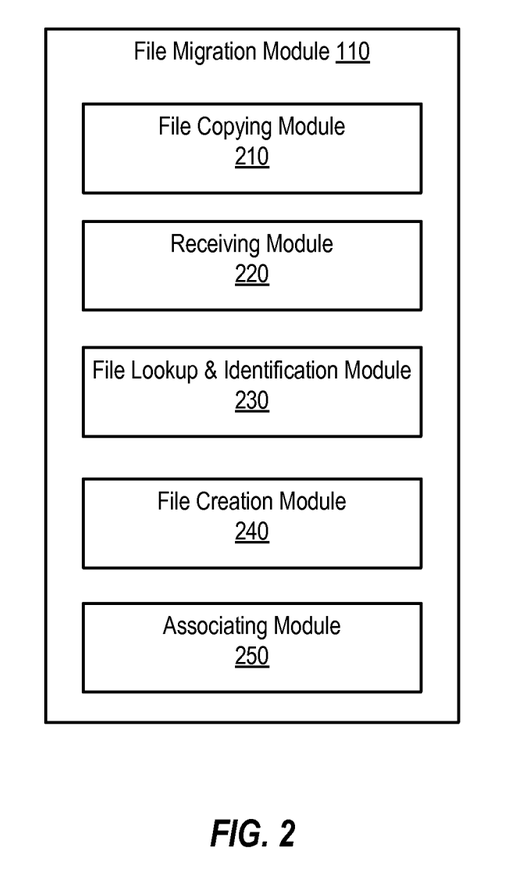
FIG. 2 illustrates an architecture of a file system migration module, according to one embodiment of the present invention.

FIG. 2 illustrates an architecture of a file system migration module. File system migration module 110 enables file system migrations from a native file system to a target file system. In cases where the native file system and the target file system are on two different host computers, there can be two file system migration modules, with one file system migration module at each host computer. In addition, file system migration module 110 can be part of a file system, such as the native file system and the target file system. As shown, file system migration module 110 includes a file copying module 210, a receiving module 220, a file lookup and identification module 230, a file creation module 240, and an associating module 250.

File copying module 210 begins a file system migration process. As such, file copying module 210 identifies a native file system and a target file system. Thereafter, file copying module 210 begins copying data files from a native file system to data files on a target file system.

Receiving module 220 receives file access operations from an application. These operations can be received by receiving module 210 during the course of a file system migration process. These operations identify a file to be accessed by the application in order to perform an operation. These operations can include read and write operations.

File lookup and identification module 230 performs file lookup operations on behalf of an application. A lookup operation is an operation performed by file lookup and identification module 230 to locate a file on which the application wishes to perform an operation. File lookup and identification module 230 also provides information regarding the location of the file being looked up to the application. This information identifies the location of the file on a file system or identifies a temporary representation of a file (e.g., a pseudo vnode) within a target file system. As an example, the information identifying the pseudo vnode of a file can include a pointer or a link identifying the location of the file on a native file system.

File creation module 240 creates a file on a target system, such as a target file system. As such, file creation module 240 coordinates with file copying module 210 to ensure a file is created and copied in its entirety from a native file system to a target file system. File creation module 240 also creates a pseudo vnode in cases where a file being looked up does not yet exist within a target file system.

A pseudo vnode is an abstraction of the file and does not include file data. Instead, a pseudo vnode acts as a temporary placeholder for a file. Once the pseudo vnode is created, the pseudo vnode can be stored within a target file system. If a file access operation referencing the same file is received after creation of the pseudo vnode but before the file is copied from the native file system to the target file system, the pseudo vnode can be utilized to perform such an operation. This prevents having to recreate another pseudo vnode for the same file.

Once the corresponding file is copied over from the native file system to the target file system, the pseudo vnode can be associated with or converted into a permanent vnode for the file by file creation module 240. This association occurs by associating the pseudo vnode with a vnode for the file as stored on the native file system.

Associating module 250 creates an association (e.g., a link or pointer) between a pseudo vnode created by file creation module 240 and a vnode for the file stored on a native file system. Associating module 250 also removes this association once the file is copied to a target file system or once all files that form part of a file system migration have been copied over to a target file system.

Figure 3:
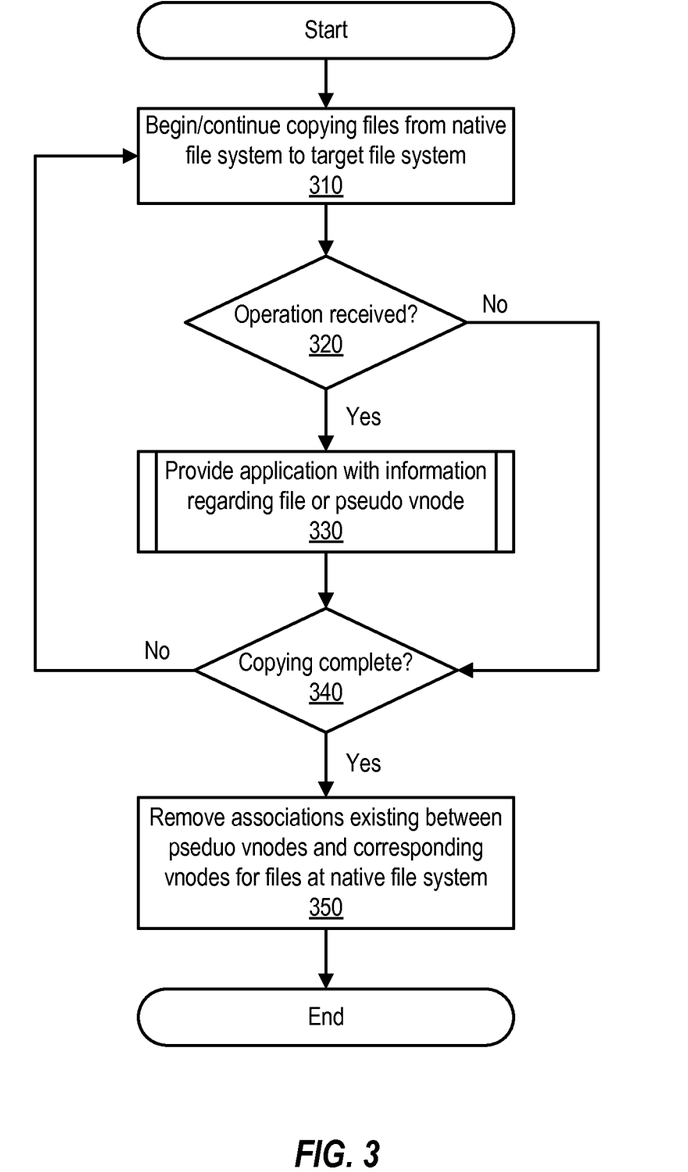
FIG. 3 is a flowchart illustrating an exemplary process for performing file system migrations, according to one embodiment of the present invention.

FIG. 3 is a flowchart illustrating an exemplary process for performing file system migrations. The process of FIG. 3 is performed by a file system migration module, such as file system migration module 110 of FIG. 2.

Prior to performing the process of FIG. 3, a host computer will add storage (e.g., target storage) to allow for a target file system. A target volume manager will then configure the target storage according to a desired file system format to create the target file system. Thereafter, the host can restart an application to configure such an application to utilize the target file system to perform further operations. Once completed, a file system migration process such as the one described in FIG. 3 can begin.

The process of FIG. 3 begins at 310 where a file system migration process begins. At 310 the process begins by copying files from a native file system to the target file system. This copying is performed as part of a background process to allow a computer system and its components, such as an application, to continue operating. To complete a file system migration process, all files on the native file system should be copied to the target file system. These files should also be placed into corresponding folders in the target file system.

While this occurs, a file system migration module may receive a file access operation from an application. For this reason, a determination is made as to whether any file access operations have been received from an application at 320. In the event that a file access operation is received at 320, the process continues to 330. At 330, the file system migration module provides information regarding the file (e.g., information describing the vnode of the file) or a pseudo vnode to an application. The details as to how this information is provided to an application are explained in further details with regards to FIG. 4.

The information provided to an application at 330 allows an application to locate a file and perform an operation on such a file. Once completed, the process continues to 340. Alternatively, if no file access operations are received at 320, the process continues directly to 340. At 340, a determination is made as to whether all files on the native file system have been copied to the target file system. If all files have been copied, the process continues to 310, where the copying of files from the native file system to the target file system continues.

If all files have indeed been copied from the native file system to the target file system, the process continues to 350. At 350, the file system migration module removes any associations existing between pseudo vnodes at a target file system and the corresponding vnodes for files at a native file system. Alternatively, the removal of existing associations can be performed after each individual file is copied to a target file system. At this point, the process ends.

Once the process of FIG. 3 ends, the host computer can stop and restart the application to re-mount the target file system. In addition, the host computer can choose to remove the native file system or retain the native file system.

Figure 4:
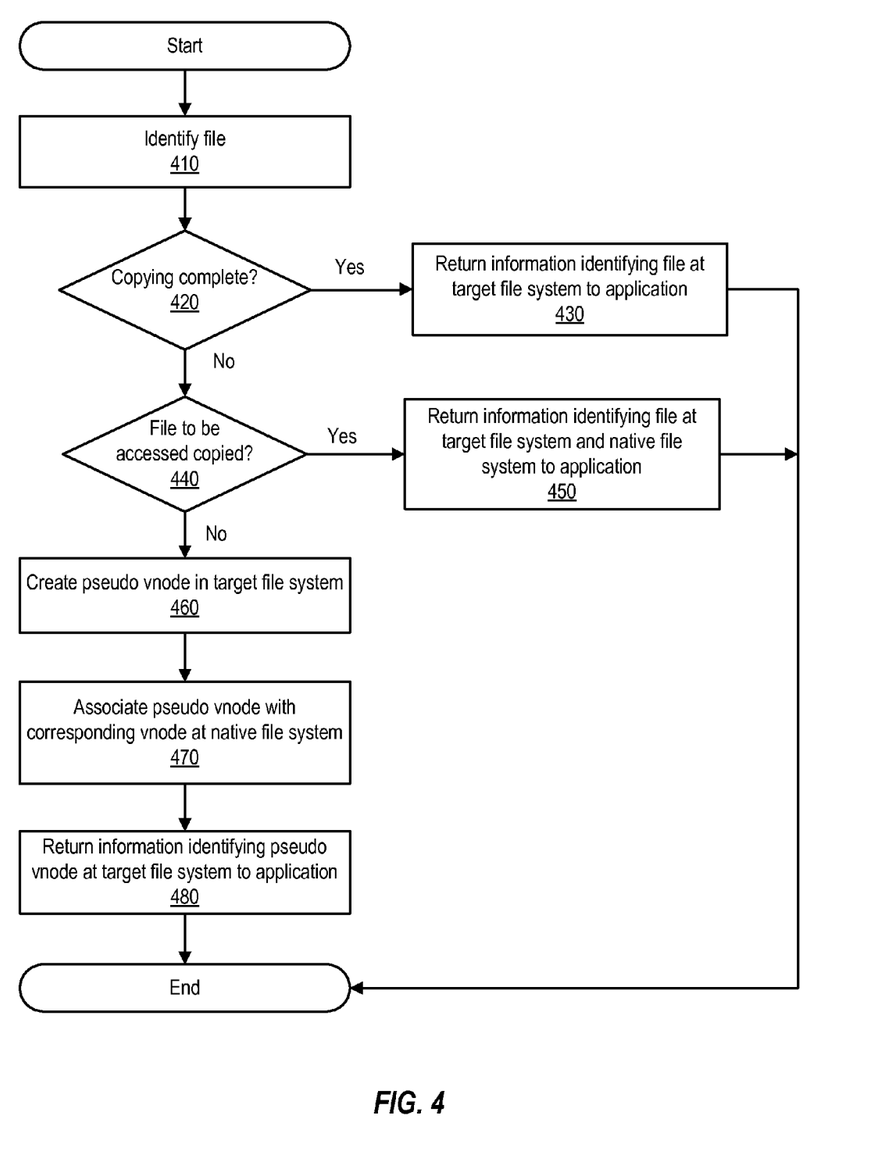
FIG. 4 is a flowchart illustrating an example process for processing file access operations received during a file system migration, according to one embodiment of the present invention.

FIG. 4 is a flowchart illustrating an example process for processing file access operations during file system migrations. The process of FIG. 4 is performed by a file system migration module and is performed in response to receiving a file access operation from an application during a file system migration process.

The process begins at 410 where a file to be accessed by an application is identified by a file system migration module. At 420, a determination is made as to whether all files from a native file system have been copied to a target file system. If such copying is complete, the process continues to 430.

In this scenario, the file to be accessed by an application has already been copied to a target file system, in its entirety, given that all files that form part of the native file system have already been copied to the target file system. An application thus looks to the file at the target file system to perform such a file access operation. A file system migration module will return information identifying the file (e.g., the file vnode) at the target file system to an application at 430.

In situation where all files have not been copied from the native file system to the target file system, the process continues to 440. At 440, a determination is made as to whether the file to be accessed by the application has been copied to the target file system. If the file to be accessed by the application has been copied to the target file system, the process continues to 450.

At 450, a file system migration module returns information identifying a file at the target file system and at the native file system to an application. This is because in this scenario the file to be accessed exists at both file systems and will continue to exist at both file system until a file system migration process completes. In order to retain data consistency for data within a file, an application should perform the file access operation on all copies of the file, as stored within both file systems.

If the file to be accessed by an application has not yet been copied to the target file system, the process continues to 460. At 460, a pseudo vnode is created for the file at the target file system. A pseudo vnode can be created by adding the pseudo vnode to a list of vnodes and associating the pseudo vnode with the vnode for the corresponding file at the native file system. A pseudo vnode is a temporary abstraction of the file and does not contain data. Once a file is created, the pseudo vnode can either be deleted or can be associated with the vnode for the file at the target file system.

At 470, the pseudo vnode in the target file system is associated with the corresponding vnode of the file at the native file system. This association can be made by establishing a connection path between the pseudo vnode at the target file system and the actual vnode for the file at the native file system. As an example, this association can be made in the form of a logical link or a pointer between the pseudo vnode and the actual vnode.

By linking the pseudo vnode at the target file system and the vnode at the native file system, a file can be found by an application without having to create the file at the target file system. Creating a pseudo vnode and creating an association between the pseudo vnode and the vnode at the native file system link is an attractive option because creating a pseudo vnode and an association can have a reduced impact on the performance of an application. By contrast, creating a file at the target file system may utilize more computer resources and may have a greater impact on the performance of an application.

Having created a pseudo vnode and an association between the pseudo vnode and the vnode for the file at the native file system, the process continues to 480. At 480, a file system migration module returns information identifying the pseudo vnode at the target file system to the application. This information can help the application utilize the pseudo vnode to identity and access the file needed to perform an operation via the association established at 470.

Modifications performed on a file identified by the pseudo vnode will be performed on the file as stored on the native file system. Once the file is copied from the native file system to the target file system, these modifications will already be reflected on the copied file and no further operations will need to be performed to reflect such file access operations. At this point, the process ends. The process of FIG. 4 can be repeated any time a file access operation is received by a file system migration module during the course of a file system migration process.

Figure 5:
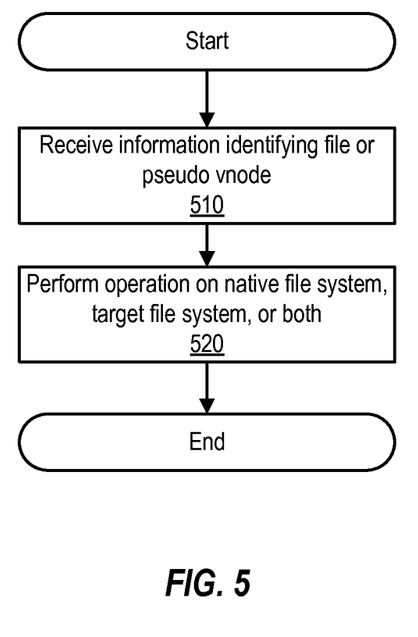
FIG. 5 is a flowchart illustrating an example process for performing file access operations on a file during a file system migration, according to one embodiment of the present invention.

FIG. 5 is a flowchart illustrating an example process for performing file access operations during a file system migration. The process of FIG. 5 is performed by an application executing on a host computer.

At 510, an application receives information identifying a file (e.g., a file vnode) or pseudo vnode from a file system migration module. This information allows the application to perform an operation on a file located either on a target file system, on a native file system, or on both. In cases where all files that are part of a file system migration have already been copied from a native file system to a target file system, the information received at 510 includes information identifying the file located at the target file system. One example of this information can be a file vnode representing the file at the target file system. At 520, the application performs the operation on the file located at the target file system.

Alternatively, if all files that are part of a file system migration have not yet been copied to a target file system, but the file to be accessed by the operation has been copied to the target file system, the information received at 510 includes information identifying the file at both the native and target file systems and hence two vnodes. At 520, the application will perform the operation on the file located at both the native and target file systems. The operation is performed at both file systems in this scenario in order to ensure data consistency is maintained at both file systems throughout the remainder of the file system migration process.

In cases where the file to be accessed by an operation has not yet been copied to the target file system, the information received at 510 includes information identifying a pseudo vnode at the target file system. At 520, the application performs the operation using the pseudo vnode, which is associated with the vnode for the file at the native file system. Thus, the operation is performed on the file at the native file system. Once the file is copied from the native file system to the target file system, changes made by the operation will already be reflected by the copied file. At this point, the process ends.

Figure 6:
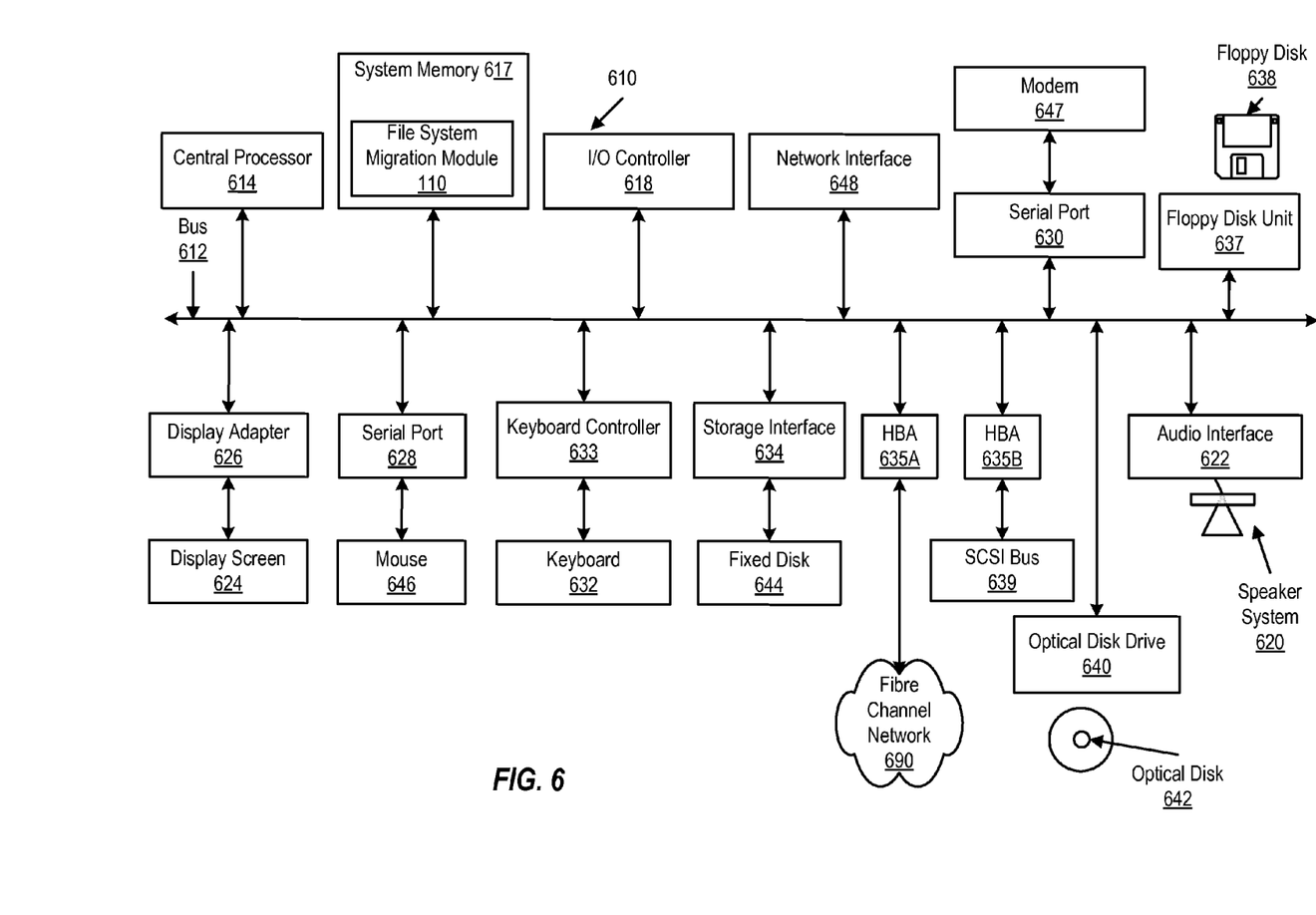
FIG. 6 is a block diagram of a computing system, according to one embodiment of the present invention.

FIG. 6 is a block diagram of a computing system suitable for optimizing lookup operations during file system migrations, as described above. Computer system 610 includes a bus 612 which interconnects major subsystems of computer system 610, such as a central processor 614, a system memory 617 (typically RAM, but which can also include ROM, flash RAM, or the like, and which can also include software such as file system migration module 110 like that shown in FIG. 2), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk unit 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical disk drive 640), a floppy disk unit 637, or other storage medium. Additionally, applications can be in the form of electronic signals modulated in accordance with the application and data communication technology when accessed via modem 647 or network interface 648.

Storage interface 634, as with the other storage interfaces of computer system 610, can connect to a standard computer-readable medium for storage and/or retrieval of information, such as a fixed disk drive 644. Fixed disk drive 644 can be a part of computer system 610 or can be separate and accessed through other interface systems. Modem 647 can provide a direct connection to a remote server via a telephone link or to the Internet via an internet service provider (ISP). Network interface 648 can provide a direct connection to a remote server via a direct network link to the Internet via a POP (point of presence). Network interface 648 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 6 need not be present to practice the present invention. The devices and subsystems can be interconnected in different ways from that shown in FIG. 6. The operation of a computer system is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
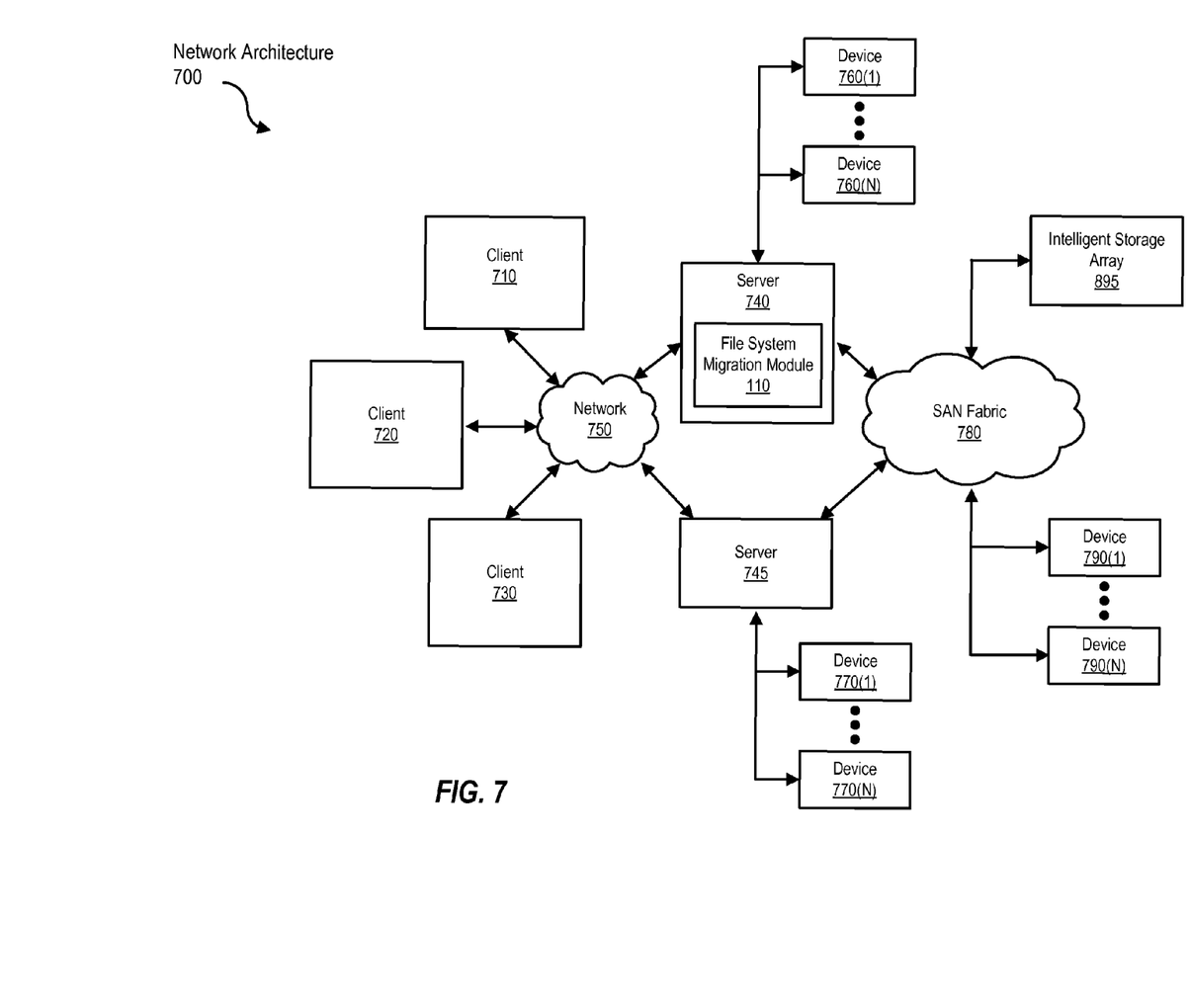
FIG. 7 is a block diagram of a network system, according to one embodiment of the present invention.

FIG. 7 is a block diagram of a network architecture 700 in which client systems 710, 720, and 730 and servers 740 and 745 can be coupled to a network 750. Client systems 710, 720, and 730 generally represent any type or form of computing device or system, such as computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 can include a file system migration module 110, as shown in FIG. 2.

As illustrated in FIG. 7, one or more storage devices 760(1)-(N) can be directly attached to server 740. Similarly, one or more storage devices 770(1)-(N) can be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) can represent network-attached storage (NAS) devices configured to communicate with servers 740 and 745 using various protocols, such as Network File System (NFS), Server Message Block (SMB), or Common Internet File System (CIFS).

Servers 740 and 745 can also be connected to a storage area network (SAN) fabric 780. SAN fabric 780 generally represents any type or form of computer network or architecture capable of facilitating communication between multiple storage devices. SAN fabric 780 can facilitate communication between servers 740 and 745 and a plurality of storage devices 790(1)-(N) and/or an intelligent storage array 795. SAN fabric 780 can also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface can be used to provide connectivity between each client system 710, 720, and 730 and network 750. Client systems 710, 720, and 730 can be able to access information on server 740 or 745 using, for example, a web browser or other client software. Such software can allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein can also be encoded as a computer program, stored in server 740, run by server 745, and distributed to client systems 710, 720, and 730 over network 750.

In some examples, all or a portion of the computing devices in FIGS. 1, 2, 6, and 7 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a file system migration module 110 in FIG. 2 can transform files of a first type (e.g., a format used by a native file system) into files of a second type (e.g., a format used by a target file system).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to access a file from an application, wherein
the request is received during a file system migration operation,
the file system migration operation copies a plurality of files from a first file system to a second file system, and
the plurality of files comprises the file;
determining whether the file has been copied from the first file system to the second file system at the time the request is received;
if the file has not been copied from the first file system to the second file system at the time the request is received,
creating a pseudo vnode for the file, prior to creation of a vnode for the file, in the second file system, wherein
the pseudo vnode includes information that enables the application to obtain the file from the first file system, and
the pseudo vnode is created instead of copying the file from the first file system to the second file system at the time the request is received,
creating an association between the pseudo vnode in the second file system and a vnode of the file at the first file system, wherein
the association establishes a connection path between the pseudo vnode in the second file system and the vnode of the file at the first file system, and
returning information identifying the pseudo vnode to the application, wherein
the pseudo vnode and the association allow the application to locate and access the file in the first file system without having to create the file in the second file system, and
the information identifying the pseudo vnode allows the application to perform an operation on the file at the first file system;
if the file has been copied from the first file system to the second file system at the time the request is received,
returning information identifying the file at the first and second file systems to the application, wherein
the information identifying the file at the first and second file systems allows the application to perform the operation on the file at the first and second file systems; and
copying an existing file from the first file system to the second file system when the existing file is closed at the first file system.

2. The method of claim 1, wherein
the association is a link.

3. The method of claim 1, wherein
the information identifying the pseudo vnode identifies the association between the pseudo vnode and the vnode of the file at the first file system.

4. The method of claim 1, further comprising:
performing the operation on the file at the first file system, wherein
the operation is performed using the association.

5. The method of claim 1, further comprising:
removing the association between the pseudo vnode and the vnode of the file at the first file system, wherein
the association is removed after the file system migration operation is complete.

6. The method of claim 1, further comprising:
creating the file at the second file system; and
associating the pseudo vnode with the vnode for the file at the second file system.

7. The method of claim 1, further comprising:
performing the operation on the file at the first file system, if the file has not been copied from the first file system to the second file system at the time the request is received; and
performing the operation on the file at the first and second file systems, if the file has been copied from the first file system to the second file system at the time the request is received.

8. A non-transitory computer readable storage medium comprising program instructions executable to:
receive a request to access a file from an application, wherein
the request is received during a file system migration operation,
the file system migration operation copies a plurality of files from a first file system to a second file system, and
the plurality of files comprises the file;
determine whether the file has been copied from the first file system to the second file system at the time the request is received;
if the file has not been copied from the first file system to the second file system at the time the request is received,
create a pseudo vnode for the file, prior to creation of a vnode for the file in the second file system, wherein
the pseudo vnode includes information that enables the application to obtain the file from the first file system, and
the pseudo vnode is created instead of copying the file from the first file system to the second file system at the time the request is received,
create an association between the pseudo vnode in the second file system and a vnode of the file at the first file system, wherein the association establishes a connection path between the pseudo vnode in the second file system and the vnode of the file at the first file system, and return information identifying the pseudo vnode to the application, wherein the pseudo vnode and the association allow the application to locate and access the file in the first file system without having to create the file in the second file system, and the information identifying the pseudo vnode allows the application to perform an operation on the file at the first file system;

if the file has been copied from the first file system to the second file system at the time the request is received, return information identifying the file at the first and second file systems to the application, wherein the information identifying the file at the first and second file systems allows the application to perform the operation on the file at the first and second file systems; and copy an existing file from the first file system to the second file system when the existing file is closed at the first file system.

9. The non-transitory computer readable storage medium of claim 8, wherein the association is a link.

10. The non-transitory computer readable storage medium of claim 8, wherein the information identifying the pseudo vnode identifies the association between the pseudo vnode and the vnode of the file at the first file system.

11. The non-transitory computer readable storage medium of claim 8, wherein the program instructions are further executable to:

perform the operation on the file in the first file system, wherein the operation is performed using the association.

12. The non-transitory computer readable storage medium of claim 8, wherein the program instructions are further executable to:

remove the association between the pseudo vnode and the vnode of the file at the first file system, wherein the association is removed after the file system migration operation is complete.

13. The non-transitory computer readable storage medium of claim 8, wherein the program instructions are further executable to:

create the file at the second file system; and associate the pseudo vnode with the vnode for the file at the second file system.

14. The non-transitory computer readable storage medium of claim 8, wherein the program instructions are further executable to:

perform the operation on the file at the first file system, if the file has not been copied from the first file system to the second file system at the time the request is received; and perform the operation on the file at the first and second file systems, if the file has been copied from the first file system to the second file system at the time the request is received.

15. A system comprising:

one or more processors; and memory coupled to the one or more processors, wherein the memory stores program instructions executable by the one or more processors to:

receive a request to access a file from an application, wherein the request is received during a file system migration operation, the file system migration operation copies a plurality of files from a first file system to a second file system, and the plurality of files comprises the file, determine whether the file has been copied from the first file system to the second file system at the time the request is received, if the file has not been copied from the first file system to the second file system at the time the request is received, create a pseudo vnode for the file, prior to creation of a vnode for the file, in the second file system, wherein the pseudo vnode includes information that enables the application to obtain the file from the first file system, and the pseudo vnode is created instead of copying the file from the first file system to the second file system at the time the request is received, create an association between the pseudo vnode in the second file system and a vnode of the file at the first file system, wherein the association establishes a connection path between the pseudo vnode in the second file system and the vnode of the file at the first file system, and return information identifying the pseudo vnode to the application, wherein the pseudo vnode and the association allow the application to locate and access the file in the first file system without having to create the file in the second file system, and the information identifying the pseudo vnode allows the application to perform an operation on the file at the first file system, if the file has been copied from the first file system to the second file system at the time the request is received, return information identifying the file at the first and second file systems to the application, wherein the information identifying the file at the first and second file systems allows the application to perform the operation on the file at the first and second file systems, and copy an existing file from the first file system to the second file system when the existing file is closed at the first file system.

16. The system of claim 15, wherein the information identifying the pseudo vnode identifies the association between the pseudo vnode and the vnode of the file at the first file system.

17. The system of claim 15, wherein the program instructions are further executable to:

perform the operation on the file in the first file system, wherein the operation is performed using the association.

18. The system of claim 15, wherein the program instructions are further executable to:

create the file at the second file system, and associate the pseudo vnode with the vnode for the file at the second file system.

19. The system of claim 15, wherein the program instructions are further executable to:

perform the operation on the file at the first file system, if the file has not been copied from the first file system to the second file system at the time the request is received, and perform the operation on the file at the first and second file systems, if the file has been copied from the first file system to the second file system at the time the request is received.

* * * * *